M. L. SHERMAN.
AUXILIARY LEVER FOR OPERATING AND LOCKING CLUTCH PEDAL LEVERS.
APPLICATION FILED JAN. 3, 1919.
1,310,302.  Patented July 15, 1919.
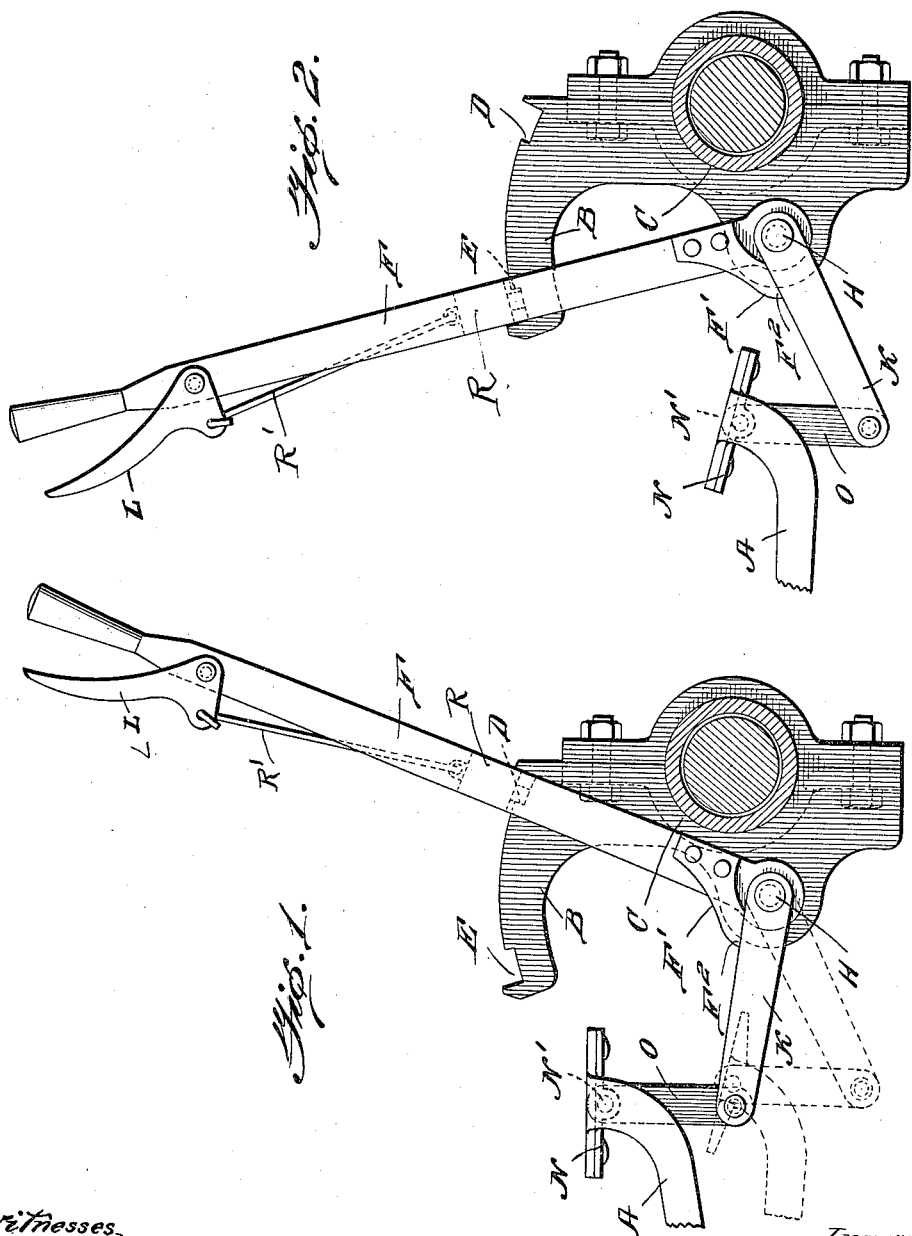

UNITED STATES PATENT OFFICE.

MILTON L. SHERMAN, OF SANDUSKY, NEW YORK.

AUXILIARY LEVER FOR OPERATING AND LOCKING CLUTCH-PEDAL LEVERS.

1,310,302.  Specification of Letters Patent.  Patented July 15, 1919.

Application filed January 3, 1919. Serial No. 269,397.

*To all whom it may concern:*

Be it known that I, MILTON L. SHERMAN, a citizen of the United States, residing at Sandusky, town of Freedom, in the county of Cattaraugus and State of New York, have invented certain new and useful Improvements in Auxiliary Levers for Operating and Locking Clutch-Pedal Levers; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in auxiliary hand operated levers for use in connection with tread levers upon tractors, motor trucks, etc., and consists in the provision of a hand operated lever having pivotal connections with the tread lever, and so arranged that the tread lever may be moved down and locked in a set position.

The invention comprises a simple and efficient device of this character having various details of construction, combination and arrangement of parts which will be hereinafter fully described, shown in the accompanying drawings and then specifically defined in the appended claims.

My invention is illustrated in the accompanying drawings which, with the letters of reference marked thereon, form a part of this application, and in which:

Figure 1 is a side elevation, showing the application of my invention to the tread or clutch pedal of a tractor, and Fig. 2 is an enlarged detail in elevation of the lever and connections for attachment to the clutch pedal.

Reference now being had to the details of the drawings by letter:

A designates the usual clutch pedal of a tractor in connection with which my improved auxiliary lever is to be used, and B is a bracket member, made preferably of cast metal and provided with a recessed portion C for attachment to the hub or axle of the tractor. Said bracket member is provided with notches D and E formed upon the upper convexed top thereof. An auxiliary lever F is pivotally mounted upon the pin H carried by the bracket member, and said lever F is provided with an integral lug F' and has its end F² inclined. A link K is pivotally connected at one end to the pin H and against which link the inclined end of the lug F² is adapted to bear when the auxiliary lever is moved to a forward position. A plate N is fastened by clips, or any other suitable means, to the clutch crank pedal of a tractor and is provided with a pintle N' projecting from one end and which has pivotal connection with one end of the link O, which in turn is pivotally connected to the link K. A pawl R, shown in dotted lines in the drawings, has pivotal connection through the medium of the rod R' with the handle R and the lever F, said pawl being adapted to engage one or another of the notches D or E to hold the lever F at the limit of its throw in opposite directions.

In operation, when it is desired to actuate the clutch pedal through the medium of the auxiliary lever, the hand lever L is turned releasing the pawl R from the recess D, after which the lever F may be swung to its limit in the opposite direction, and by throwing the pawl into the notch E, the lever may be held in the position shown in Fig. 2 of the drawings. As the end of the projection F' comes in contact with the link K, the clutch pedal, through the link connections with the auxiliary lever, will be thrown down and held by the auxiliary lever, thereby holding the clutch pedal, which will permit the operator of the tractor, in connection with which my auxiliary lever is used, to leave the tractor for any purpose without the necessity of throwing the shifting lever into neutral. When it is desired to start the tractor, in connection with which the auxiliary lever is used, all that is necessary to do, is to release the pawl through the medium of the hand lever and swing the auxiliary lever back to its starting position in which it is held by the pawl.

By the provision of an auxiliary lever operated in accordance with my invention, considerable inconvenience and time is saved, which otherwise is necessary in trying to get the gearing to stop in the correct position, so that the driver may put the shifting lever from neutral to forward speed, or gear.

It will be noted that the clutch pedal may be operated in the usual manner without any interference from the pivotal link connections between the plate which is attached to the clutch pedal and the auxiliary lever.

What I claim to be new is:

1. An auxiliary lever for use in connection with clutch levers of tractors, etc., comprising in combination with the clutch pedal, a stationary bracket member for attachment to the tractor, a lever pivotally connected to said bracket member and having pivotal link connections with the clutch pedal, a projection upon said lever adapted to frictionally engage one of the links of the connection between the lever and pedal to hold the latter down, said connections permitting the clutch pedal to operate independent of said lever.

2. An auxiliary lever for use in connection with clutch levers of tractors, etc., comprising in combination with the clutch pedal, a stationary bracket member for attachment to the hub or axle of a tractor, and having recesses in the upper edge thereof, an auxiliary lever pivoted to said bracket, and having a spring pressed latch for engagement with said recesses, said lever having an integral lug projecting therefrom near its pivotal end, a plate for attachment to the clutch pedal, and having a pintle projecting therefrom, pivotal link connections between said lever and pintle, said clutch pedal having a movement independent of the links.

In testimony whereof, I hereunto affix my signature in presence of two witnesses.

MILTON L. SHERMAN.

Witnesses:
F. S. MERRILL,
C. B. SMITH.

Copies of this patent may be obtained for five cents each, by addressing the "Commissioner of Patents, Washington, D. C."